United States Patent
Du

(10) Patent No.: US 11,669,237 B2
(45) Date of Patent: Jun. 6, 2023

(54) OPERATION METHOD AND TERMINAL DEVICE

(71) Applicant: VIVO MOBILE COMMUNICATION CO., LTD., Guangdong (CN)

(72) Inventor: Lili Du, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/483,886

(22) Filed: Sep. 24, 2021

(65) Prior Publication Data

US 2022/0011914 A1    Jan. 13, 2022

Related U.S. Application Data

(63) Continuation of application No. PCT/CN2020/080951, filed on Mar. 24, 2020.

(30) Foreign Application Priority Data

Mar. 28, 2019    (CN) .......................... 201910243206.X

(51) Int. Cl.
*G06F 3/048* (2013.01)
*G06F 3/0486* (2013.01)
*G06F 1/16* (2006.01)
*G06F 3/04817* (2022.01)

(52) U.S. Cl.
CPC .......... *G06F 3/0486* (2013.01); *G06F 1/1616* (2013.01); *G06F 1/1677* (2013.01); *G06F 3/04817* (2013.01)

(58) Field of Classification Search
CPC .... G06F 3/0486; G06F 1/1616; G06F 1/1677; G06F 3/04817
See application file for complete search history.

(56) References Cited

U.S. PATENT DOCUMENTS

| 9,864,410 B2 * | 1/2018 | La .......................... G06F 3/017 |
| 11,228,669 B2 * | 1/2022 | Jang ...................... G06F 1/1616 |
| 2011/0241998 A1 | 10/2011 | McKinney et al. |

(Continued)

FOREIGN PATENT DOCUMENTS

| CN | 106095226 A | 11/2016 |
| CN | 106250037 A | 12/2016 |

(Continued)

OTHER PUBLICATIONS

International Search Report of International Application No. PCT/CN2020/080951 dated Jun. 30, 2020.

(Continued)

*Primary Examiner* — Rashawn N Tillery
(74) *Attorney, Agent, or Firm* — IP & T Group LLP

(57) ABSTRACT

An operation method is applied to a terminal device, and the terminal device includes a first screen that is bendable and a second screen that is disposed on a side frame of the terminal device. The method includes: displaying shortcut function icons on the second screen in a case that the first screen is bent and displays an information input box; receiving a first input operation performed on a target function icon in the shortcut function icons; and in response to the first input operation, executing a function corresponding to the target function icon.

12 Claims, 7 Drawing Sheets

(56) References Cited

U.S. PATENT DOCUMENTS

| | | | | |
|---|---|---|---|---|
| 2013/0300697 A1* | 11/2013 | Kim | .................. | G06F 1/1626 345/173 |
| 2014/0218321 A1* | 8/2014 | Lee | .................. | G06F 1/1677 345/173 |
| 2015/0338988 A1* | 11/2015 | Lee | .................. | G06F 3/04886 345/173 |
| 2016/0012797 A1* | 1/2016 | Lee | .................. | G06F 1/1616 345/207 |
| 2016/0026381 A1* | 1/2016 | Kim | .................. | G06F 3/04817 715/761 |
| 2016/0062600 A1* | 3/2016 | Kim | .................. | G06F 3/0488 715/765 |
| 2016/0187994 A1* | 6/2016 | La | .................. | G06F 1/1677 345/619 |
| 2017/0115944 A1* | 4/2017 | Oh | .................. | G06F 3/04845 |
| 2018/0374411 A1* | 12/2018 | Yang | .................. | G06F 3/04883 |
| 2020/0034012 A1* | 1/2020 | Kang | .................. | H04M 1/67 |

FOREIGN PATENT DOCUMENTS

| | | | | | |
|---|---|---|---|---|---|
| CN | 107678724 | A | * | 2/2018 | |
| CN | 107678724 | A | | 2/2018 | |
| CN | 107817928 | A | | 3/2018 | |
| CN | 107943372 | A | | 4/2018 | |
| CN | 107977129 | A | | 5/2018 | |
| CN | 107977152 | A | | 5/2018 | |
| CN | 108717343 | A | | 10/2018 | |
| CN | 108958593 | A | | 12/2018 | |
| CN | 109032549 | A | | 12/2018 | |
| CN | 109462692 | A | | 3/2019 | |
| CN | 110007821 | A | | 7/2019 | |
| CN | 110839096 | A | * | 2/2020 | .......... G06F 1/1641 |
| CN | 110839096 | A | | 2/2020 | |
| WO | 2019/041136 | A1 | | 3/2019 | |

OTHER PUBLICATIONS

Written Opinion of the International Searching Authority of International Application No. PCT/CN2020/080951 dated Jun. 30, 2020.
First Office Action of Priority Application No. CN 201910243206.X dated May 20, 2020.
Second Office Action of Priority Application No. CN 201910243206.X dated Oct. 12, 2020.
Notification to Grant Patent Right for Invention of Priority Application No. CN 201910243206.X dated Feb. 7, 2021.

* cited by examiner

OPERATION METHOD AND TERMINAL DEVICE

CROSS-REFERENCE OF RELATED APPLICATIONS

This application is a Bypass Continuation Application of PCT/CN2020/080951 filed on Mar. 24, 2020, which claims priority to Chinese Patent Application No. 201910243206.X filed on Mar. 28, 2019, which are incorporated herein by reference in their entirety.

TECHNICAL FIELD

The present disclosure relates to the field of communication technologies, and in particular, to an operation method and a terminal device.

BACKGROUND

With development and progress of terminal devices, performance and functions of terminal devices become more and more powerful. Many daily life and work tasks can be completed by terminal devices. However, when editing content on a terminal device, a user often needs to switch an interface. For example, in a process of adding emoji, the user needs to first switch a display interface of a virtual keyboard to a display interface for adding emoji, so that the user edits or inputs emoji information. After editing and inputting the emoji information, the user needs to switch to the display interface of the virtual keyboard, so that the user edits and inputs text information. During operation on a terminal device in related technologies, there is a problem that the operation is cumbersome.

SUMMARY

According to a first aspect, the embodiments of the present disclosure provide an operation method, applied to a terminal device, where the terminal device includes a first screen that is bendable and a second screen that is disposed on a side frame of the terminal device, and the method includes:

displaying shortcut function icons on the second screen in a case that the first screen is bent and displays an information input box;

receiving a first input operation performed on a target function icon in the shortcut function icons; and in response to the first input operation, executing a function corresponding to the target function icon.

According to a second aspect, the embodiments of the present disclosure further provide a terminal device, including a first screen that is bendable and a second screen that is disposed on a side frame of the terminal device, where the terminal device includes:

a first display module, configured to display shortcut function icons on the second screen in a case that the first screen is bent and displays an information input box;

a first receiving module, configured to receive a first input operation performed on a target function icon in the shortcut function icons; and a processing module, configured to execute a function corresponding to the target function icon in response to the first input operation.

According to a third aspect, the embodiments of the present disclosure further provide a terminal device, including a processor, a memory, and a computer program stored in the memory and executable on the processor. When the computer program is executed by the processor, steps of the foregoing operation method are implemented.

According to a fourth aspect, the embodiments of the present disclosure further provide a non-transitory computer-readable storage medium. The non-transitory computer-readable storage medium stores a computer program. When the computer program is executed by a processor, steps of the foregoing operation method are implemented.

BRIEF DESCRIPTION OF DRAWINGS

To describe the technical solutions of the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still obtain other drawings from these accompanying drawings.

DETAILED DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of the present disclosure shall fall within the protection scope of the present disclosure.

Figure 1:
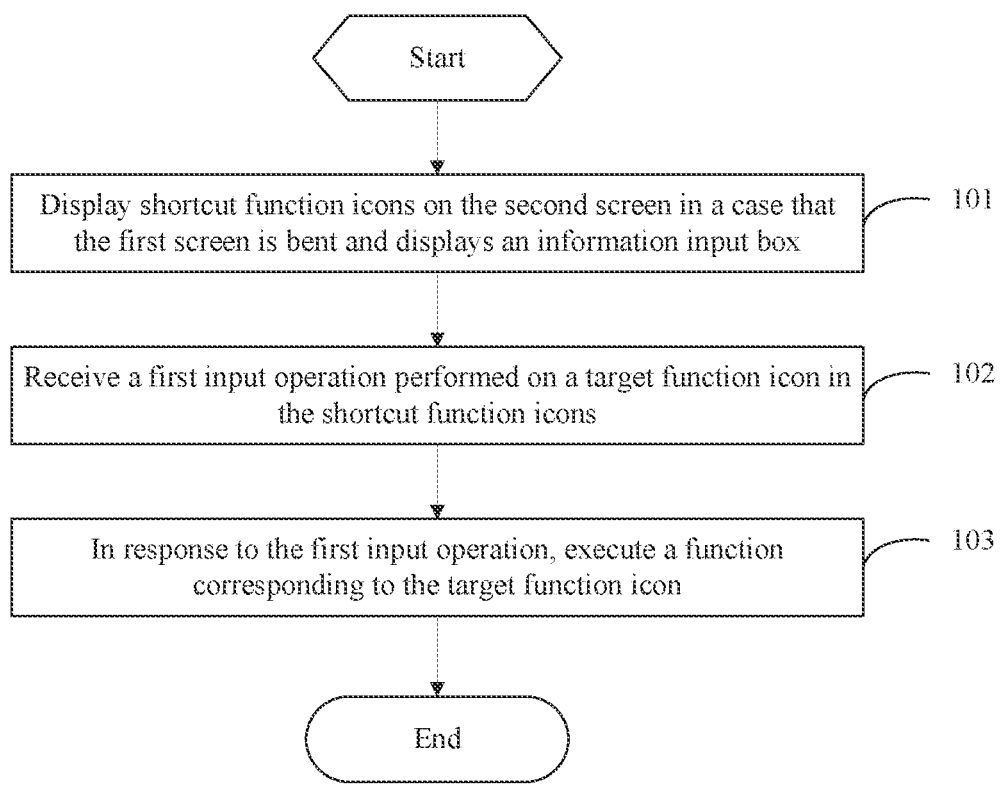
FIG. 1 is a flowchart of an operation method according to an embodiment of the present disclosure.

Referring to FIG. 1, FIG. 1 is a flowchart of an operation method according to an embodiment of the present disclosure. An operation method provided in the embodiments of the present disclosure is applied to a terminal device, where the terminal device includes a first screen that is bendable and a second screen that is disposed on a side frame of the terminal device. As shown in FIG. 1, the method includes the following steps:

Step 101: Display shortcut function icons on the second screen in a case that the first screen is bent and displays an information input box.

In this step, the first screen may be a flexible screen, the shortcut function icons may be displayed on the second screen in a case that the first screen is bent and displays the information input box, that is, the first screen is used to edit information. The shortcut function icons may be a function icon related to information editing, for example, an emoji library icon, an album icon, a contact list icon, and an input method mode switching icon.

The shortcut function icons are displayed on the second screen (that is, a side screen) of the terminal device, so that the user can execute the corresponding function. This can effectively simplify the operation of the user compared to using the first screen and switching the interface to input display content associated with a shortcut function icon.

The second screen may also be a flexible screen.

Step 102: Receive a first input operation performed on a target function icon in the shortcut function icons.

In this step, the first input operation may be a selection operation performed by the user on the target function icon, for example, a click operation or a long-press operation.

When a number of shortcut function icons exceeds a number of shortcut function icons that can be displayed by the second screen, a corresponding target function icon may be selected by sliding towards left or right.

Step 103: In response to the first input operation, execute a function corresponding to the target function icon.

In this step, in response to the first input operation, the function corresponding to the target function icon is executed, for example, emoji information associated with an emoji library icon is displayed or an input method mode is switched. This can effectively simplify the operation of the user compared to using the first screen and switching the interface to input display content associated with a shortcut function icon.

In a process of operating the second screen, the user can perform the operation with the thumb. Besides, in a process of using a keyboard for text editing, the thumb is rarely needed. Therefore, using the thumb to operate the second display screen does not affect an input operation of text editing. In addition, using the thumb to perform related operations such as adding emoji on the second screen can improve editing efficiency of the user.

In the operation method in the embodiments of the present disclosure, shortcut function icons are displayed on the second screen in a case that the first screen is bent and displays an information input box; a first input operation performed on a target function icon in the shortcut function icons is received; and in response to the first input operation, a function corresponding to the target function icon is executed. This can effectively simplify the operation of the user.

Figure 2:
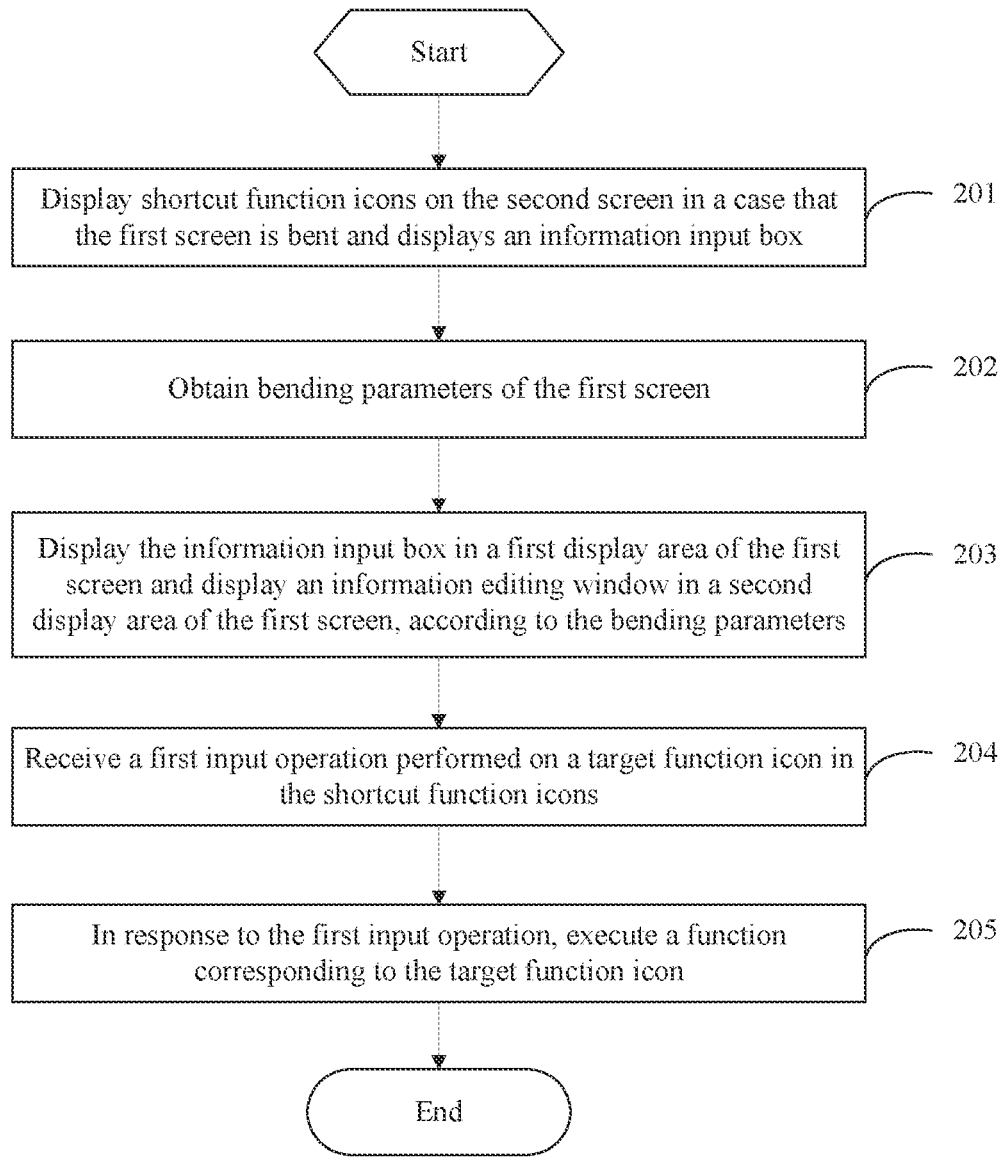
FIG. 2 is a flowchart of an operation method according to another embodiment of the present disclosure.

Referring to FIG. 2, FIG. 2 is a flowchart of an operation method according to another embodiment of the present disclosure. The method includes the following steps:

Step 201: Display shortcut function icons on a second screen in a case that a first screen is bent and displays an information input box.

Step 202: Obtain bending parameters of the first screen.

Step 203: Display the information input box in a first display area of the first screen and display an information editing window in a second display area of the first screen, according to the bending parameters.

Step 204: Receive a first input operation performed on a target function icon in the shortcut function icons.

Step 205: In response to the first input operation, execute a function corresponding to the target function icon.

The bending parameters of the first screen are obtained, to divide the first screen into the first display area and the second display area, that is, the first screen is bent into a form similar to a laptop, to facilitate user input.

Figure 3:
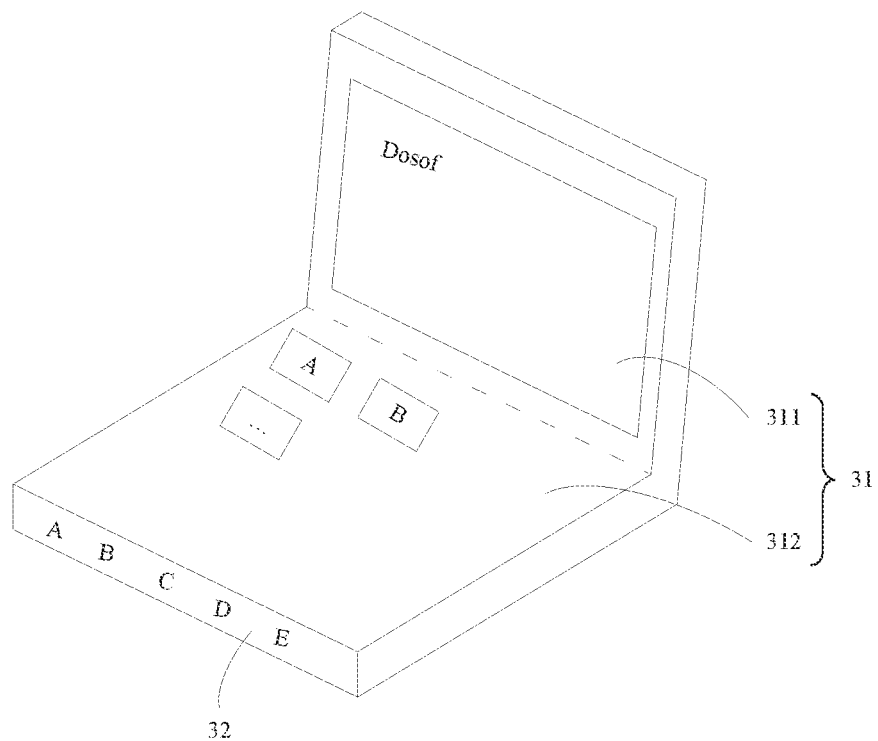
FIG. 3 is a schematic structural diagram of a terminal device according to an embodiment of the present disclosure.

As shown in FIG. 3, the terminal device includes a first screen 31 and a second screen 32 that is disposed on a side frame of the terminal device. The first screen 31 is divided into a first display area 311 and a second display area 312.

The first display area is used to display the information input box such as a chat session interface, and the second display area is used to display the information editing window such as a virtual keyboard window. The second display area is in the horizontal direction, and the first display area can directly face the face of the user. In this way, the user does not need to lower the head to view the display area of the screen of the terminal device when editing information. This effectively alleviates the problem that the user needs to lower the head during information editing in related technologies, and can avoid cervical spine damage caused by lowering the head for a long time and improve the health of the user.

The bending parameters may include a bending angle and a bending position. For example, the user may determine sizes of the first display area and the second display area based on the bending position, and select an appropriate bending angle to meet a usage habit of the user.

As shown in FIG. 3, the second screen 32 is disposed on a side frame on a side on which a first side of the second display area 312 of the first screen 31 is located, where the first side is a side of the second display area 312 away from the first display area 311. Because the first display area 311 and the second display area 312 are disposed at a specific angle and the first side is close to the user, it is convenient for the user to operate on the second screen 32 by disposing the second screen 32 on the side frame on the side on which the first side is located.

Optionally, the executing a function corresponding to the target function icon includes: in a case that the target function icon is an emoji library icon, displaying emoji information associated with the emoji library icon on the second screen; in a case that the target function icon is an album icon, displaying images associated with the album icon on the second display area; in a case that the target function icon is a contact list icon, displaying contact icons associated with the contact list icon on the second screen; and in a case that the target function icon is an input method mode switching icon, switching an input method mode.

In this implementation, the function corresponding to the target function icon is executed. This can effectively simplify the operation of the user compared to using the first screen and switching the interface to input display content associated with a shortcut function icon.

In a case that the target function icon is an emoji library icon, emoji information associated with the emoji library icon is displayed on the second screen. The emoji information can be scrolled by sliding towards left or right, so that the user can find appropriate emoji information. When a click operation performed on an emoji is received, the emoji is added to the information input box. When a sliding operation of sliding two fingers from two sides to the middle at the same time is received, all emojis may be hidden to return to a display interface for selecting the shortcut function icons. Moreover, the frequency of using each emoji further may be counted, and the most frequently used emoji is updated to the middle position of the second screen, so that the user selects and sends the emoji and extensive sliding by the user to search the emoji is avoided.

Optionally, after the displaying mages associated with the album icon on the second display area, the method further includes: receiving a drag operation performed on a target image displayed in the second display area; and in response to the drag operation, moving the target image from the second display area to the information input box.

In this implementation, in a case that the target function icon is an album icon, images associated with the album icon may be displayed on the second display area. Moreover, a click operation performed on the target image displayed in the second display area may be received, to add the target image to the information input box. Alternatively, a drag operation performed on the target image displayed in the second display area may be received, and in response to the drag operation, the target image is dragged to the target position in the information input box to add the target image to the target position, to complete an image insertion operation. In addition, the album icon displayed on the second screen may be clicked again to return to the display interface for selecting the shortcut function icons.

Optionally, after the displaying contact icons associated with the contact list icon on the second screen, the method further includes: receiving an association operation performed on at least two contact icons displayed on the second screen; and in response to the association operation, creating a chat group including contacts corresponding to the at least two contact icons, and displaying the chat group in the first display area.

In this implementation, in a case that the target function icon is a contact list icon, contact icons associated with the contact list icon is displayed on the second screen. If an operation for associating at least two contact icons is received, a chat group including contacts corresponding to the at least two contact icons may be created, and the chat group is displayed in the first display area. For example, a contact icon is held and moved to another contact icon, so that a chat group may be quickly created, and a bulk SMS message function may be executed in an SMS message scenario. If a contact icon of a to-be-created group is displayed on a currently displayed display bar of the second screen, a sliding operation of sliding two fingers inward from two sides may be received to quickly create a group. Compared with related technologies in which contacts are added one by one to create a group, this can effectively simplify user operations and further can enhance user operating experience.

If a click operation performed on a contact icon is received, the information input box is switched to a chat interface with the contact. If an upward sliding operation performed on the contact icon in current chat is received, the chat interface with the contact is exited.

In a case that the target function icon is an input method mode switching icon, an input method mode is switched, for example, switching between Chinese and English is performed.

In the operation method in the embodiments of the present disclosure, shortcut function icons are displayed on the second screen in a case that the first screen is bent and displays an information input box; bending parameters of the first screen is obtained; the information input box is displayed in a first display area of the first screen and an information editing window is displayed in a second display area of the first screen, according to the bending parameters; a first input operation performed on a target function icon in the shortcut function icons is received; and in response to the first input operation, a function corresponding to the target function icon is executed. This can effectively simplify the operation of the user.

Figure 4:
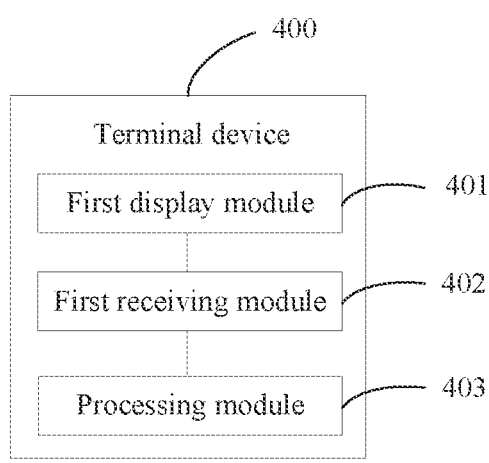
FIG. 4 is a first structural diagram of a terminal device according to an embodiment of the present disclosure.

Referring to FIG. 4, FIG. 4 is a structural diagram of a terminal device according to an embodiment of the present disclosure. As shown in FIG. 4, the terminal device 400 includes: a first display module 401, a first receiving module 402, and a processing module 403.

The first display module 401 is configured to display shortcut function icons on the second screen in a case that the first screen is bent and displays an information input box.

The first receiving module 402 is configured to receive a first input operation performed on a target function icon in the shortcut function icons.

The processing module 403 is configured to execute a function corresponding to the target function icon in response to the first input operation.

Figure 5:
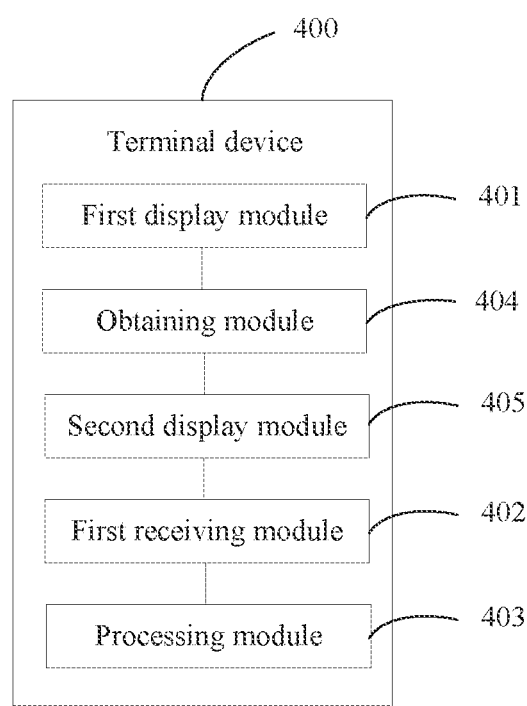
FIG. 5 is a second structural diagram of a terminal device according to an embodiment of the present disclosure.

Optionally, as shown in FIG. 5, the terminal device 400 further includes:

an obtaining module 404, configured to obtain bending parameters of the first screen, where the bending parameters include a bending angle and a bending position; and a second display module 405, configured to display the information input box in a first display area of the first screen and display an information editing window in a second display area of the first screen, according to the bending parameters.

Optionally, the processing module 403 includes:

a first display unit, configured to display emoji information associated with an emoji library icon on the second screen in a case that the target function icon is the emoji library icon;

a second display unit, configured to display images associated with an album icon on the second display area in a case that the target function icon is the album icon;

a third display unit, configured to display contact icons associated with a contact list icon on the second screen in a case that the target function icon is the contact list icon; and a switching unit, configured to switch an input method mode in a case that the target function icon is an input method mode switching icon.

Figure 6:
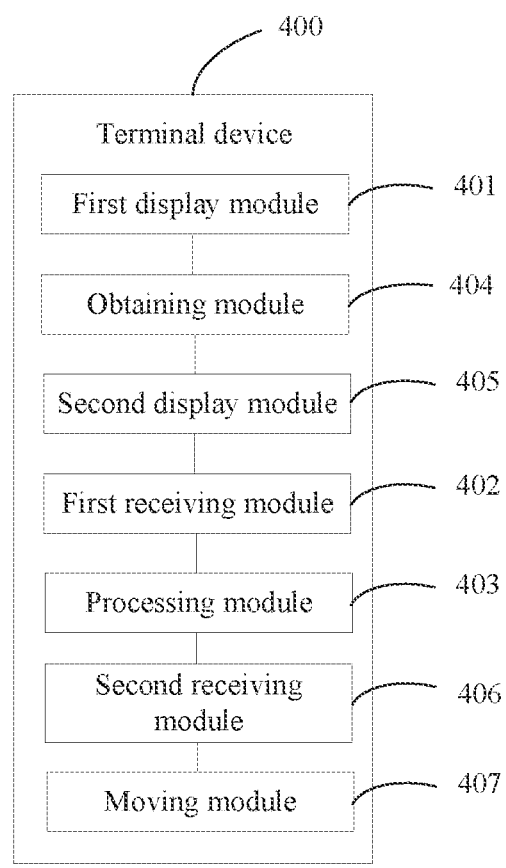
FIG. 6 is a third structural diagram of a terminal device according to an embodiment of the present disclosure.

Optionally, as shown in FIG. 6, the terminal device 400 further includes:

a second receiving module 406, configured to receive a drag operation performed on a target image displayed in the second display area; and a moving module 407, configured to move the target image from the second display area to the information input box in response to the drag operation.

Figure 7:
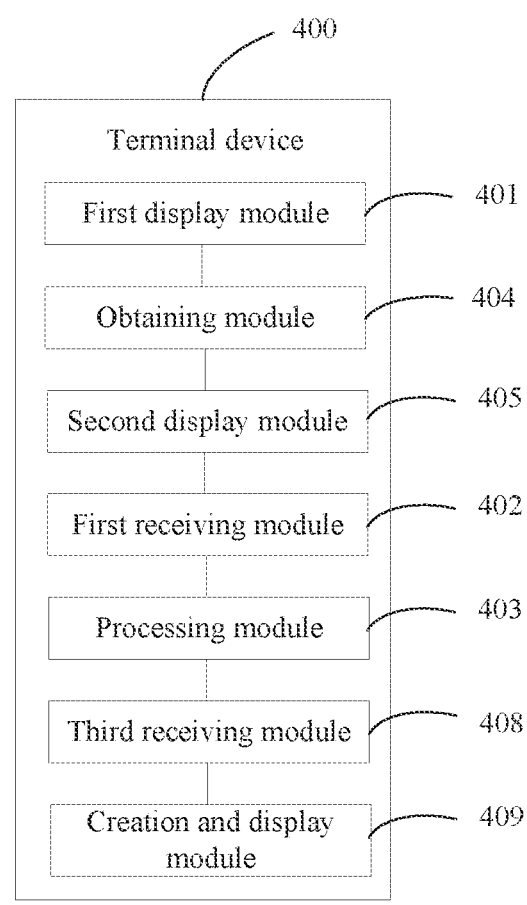
FIG. 7 is a fourth structural diagram of a terminal device according to an embodiment of the present disclosure.

Optionally, as shown in FIG. 7, the terminal device 400 further includes:

a third receiving module 408, configured to receive an association operation performed on at least two contact icons displayed on the second screen; and a creation and display module 409, configured to create a chat group including the at least two contacts, and display the chat group in the first display area in response to the association operation.

The terminal device 400 can implement each process implemented by the terminal device in the foregoing method embodiment. To avoid repetition, details are not described herein again.

The terminal device 400 in the embodiments of the present disclosure displays shortcut function icons on the second screen in a case that the first screen is bent and displays an information input box; receives a first input operation performed on a target function icon in the shortcut function icons; and in response to the first input operation, executes a function corresponding to the target function icon. This can effectively the operation of the user.

Figure 8:
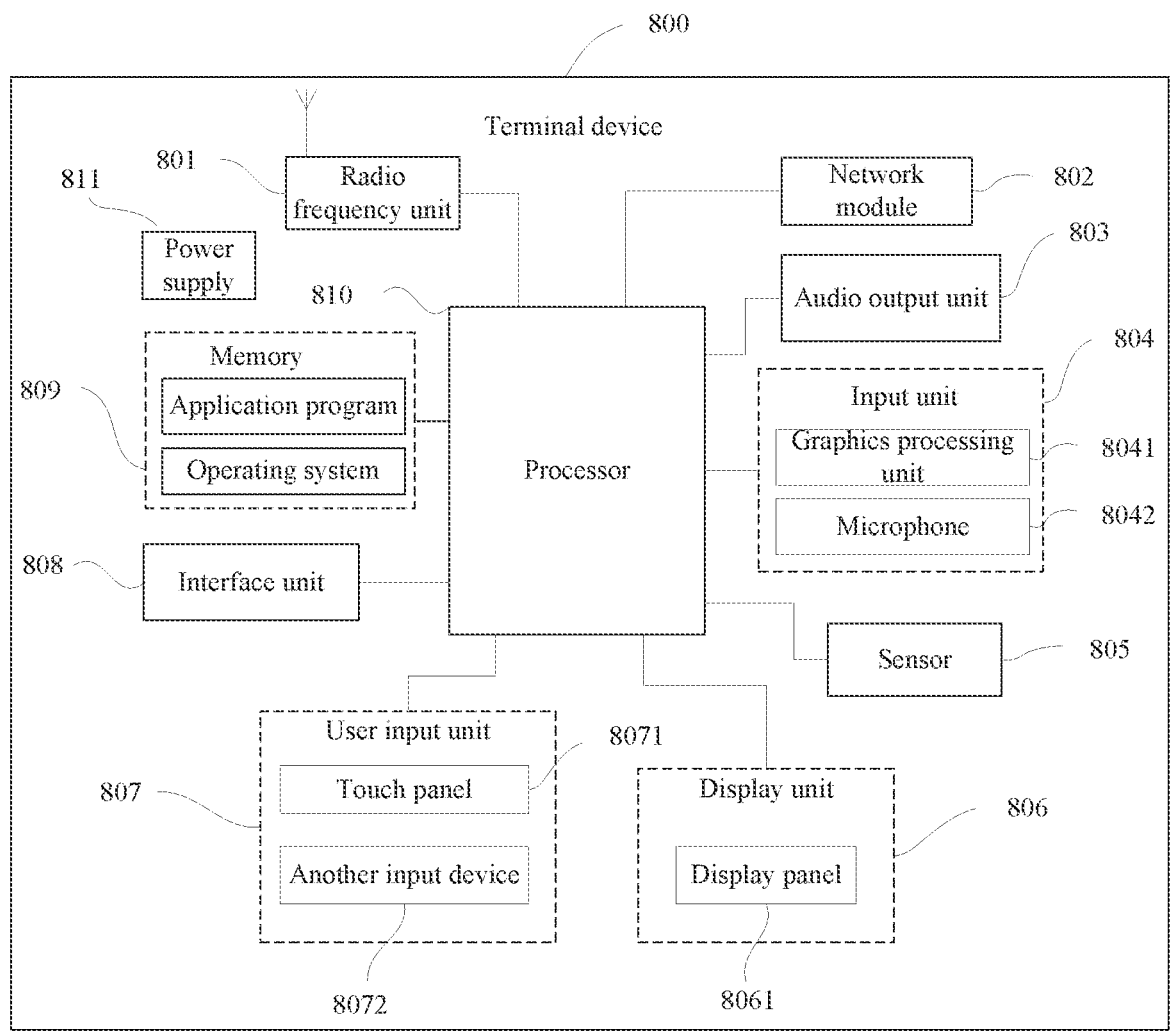
FIG. 8 is a structural diagram of a terminal device according to another embodiment of the present disclosure.

FIG. 8 is a schematic diagram of a hardware structure of a terminal device implementing the various embodiments of the present disclosure. As shown in FIG. 8, the terminal device 800 includes, but not limited to: a radio frequency unit 801, a network module 802, an audio output unit 803, an input unit 804, a sensor 805, a display unit 806, a user input unit 807, an interface unit 808, a memory 809, a processor 810, a power supply 811, and the like. A person skilled in the art may understand that the structure of the terminal device shown in FIG. 8 does not constitute a limitation to the terminal device. The terminal device may include more or fewer components than that shown in the figure, or a combination of some components, or an arrangement of different components. In this embodiment of the present disclosure, the terminal device includes, but is not limited to, a mobile phone, a tablet computer, a notebook computer, a palmtop computer, a vehicle-mounted terminal, a wearable device, a pedometer, or the like.

The display unit 806 is configured to display a shortcut function icon on the second screen in a case that the first screen is bent and displays an information input box; the user input unit 807 is configured to receive a first input operation performed on a target function icon in at least one shortcut function icon; and the processor 810 is configured to: in response to the first input operation, execute a function corresponding to the target function icon.

The terminal device 800 can implement each process implemented by the terminal device in the foregoing embodiments. To avoid repetition, details are not described herein again.

The terminal device 800 in the embodiments of the present disclosure displays shortcut function icons on the second screen in a case that the first screen is bent and displays an information input box; receives a first input operation performed on a target function icon in the shortcut function icons; and in response to the first input operation, executes a function corresponding to the target function icon. This can effectively simplify the operation of the user.

It should be understood that in the embodiments of the present disclosure, the radio frequency unit 801 can be configured to receive and send information or receive and send signal during calls. For example, the radio frequency unit 801 receives downlink data from a base station, and transmits the downlink data to the processor 810 for processing. In addition, the radio frequency unit 801 sends uplink data to the base station. Generally, the radio frequency unit 801 includes but is not limited to an antenna, at least one amplifier, a transceiver, a coupler, a low noise amplifier, a duplexer, and the like. In addition, the radio frequency unit 801 may further communicate with another device through a wireless communications system and network.

The terminal device provides a user with wireless broadband Internet access through the network module 802, for example, helps the user send and receive emails, browse web pages, and access streaming media.

The audio output unit 803 can convert audio data received by the radio frequency unit 801 or the network module 802 or stored in the memory 809 into an audio signal, and output the audio signal as sound. Moreover, the audio output unit 803 may further provide audio output (for example, call signal receiving sound and message receiving sound) related to a specific function performed by the terminal device 800. The audio output unit 803 includes a loudspeaker, a buzzer, a receiver, and the like.

The input unit 804 is configured to receive audio or video signals. The input unit 804 may include a graphics processing unit (GPU) 8041 and a microphone 8042. The graphics processing unit 8041 processes image data of a static picture or a video obtained by an image capturing apparatus (for example, a camera) in video capturing mode or image capturing mode. A processed image frame can be displayed on the display unit 806. The image frame processed by the graphics processor 8041 may be stored in the memory 809 (or another storage medium) or sent by using the radio frequency unit 801 or the network module 802. The microphone 8042 may receive a sound and can process such sound into audio data. The processed audio data can be converted into a format that can be sent to a mobile communications base station through the radio frequency unit 801 in a telephone call mode, for outputting.

The terminal device 800 further includes at least one sensor 805, for example, an optical sensor, a motion sensor, and other sensors. For example, the optical sensor includes an ambient optical sensor and a proximity sensor. The ambient optical sensor may adjust luminance of the display panel 8061 based on brightness of ambient light. The proximity sensor may turn off the display panel 8061 and/or backlight when the terminal device 800 approaches an ear. As a type of motion sensor, an accelerometer sensor can detect magnitudes of accelerations in all directions (usually three axes), can detect a magnitude and a direction of gravity in a static state, and can be configured to recognize a terminal device posture (such as screen switching between portrait and landscape, related games, and magnetometer posture calibration), functions related to vibration recognition (such as pedometer and tapping), and the like. The sensor 805 may also include a fingerprint sensor, a pressure sensor, an iris sensor, a molecular sensor, a gyroscope, a barometer, a hygrometer, a thermometer, an infrared sensor, and the like. Details are not described herein.

The display unit 806 is configured to display information input by the user or information provided to the user. The display unit 806 may include the display panel 8061, and the display panel 8061 may be configured in a form of a liquid crystal display (LCD), an organic light-emitting diode (OLED), or the like.

The user input unit 807 may be configured to receive input numeral or character information, and generate key signal input related to user setting and function control of the terminal device. For example, the user input unit 807 includes a touch panel 8071 and another input device 8072. The touch panel 8071 is also referred to as a touchscreen, and may collect a touch operation performed by a user on or near the touch panel 8071 (such as an operation performed by a user on the touch panel 8071 or near the touch panel 8071 by using any proper object or accessory, such as a finger or a stylus). The touch panel 8071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 810, receives a command sent by the processor 810, and executes the command. In addition, the touch panel 8071 may be implemented by using a plurality of types such as a resistive type, a capacitive type, an infrared ray, and a surface acoustic wave. In addition to the touch panel 8071, the user input unit 807 may further include another input device 8072. For example, the another input device 8072 may include but is not limited to a physical keyboard, a function key (such as a volume control key or a power on/off key), a trackball, a mouse, a joystick, and the like. Details are not described herein.

Optionally, the touch panel 8071 may cover the display panel 8061. When the touch panel 8071 detects touch operations thereon or nearby, the touch panel 8071 transmits the touch operations to the processor 810 to determine a type of a touch event. Subsequently, the processor 810 provides corresponding visual output on the display panel 8061 according to the type of the touch event. Although in FIG. 8, the touch panel 8071 and the display panel 8061 are configured as two independent components to implement input and output functions of the terminal device, in some embodiments, the touch panel 8071 and the display panel 8061 can be integrated to implement the input and output functions of the terminal device. Details are not limited herein.

The interface unit 808 is an interface for connecting an external apparatus to the terminal device 800. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 808 may be configured to receive an input (for example, data information or power) from an external apparatus and transmit the received input to one or more elements in the terminal device 800, or transmit data between the terminal device 800 and the external apparatus.

The memory 809 may be configured to store a software program as well as various types of data. The memory 809 may mainly include a program storage area and a data storage area. The program storage area may store an operating system, an application program required by at least one function (such as a sound playback function and an image playback function), and the like. The data storage area may store data (such as audio data and an address book) created based on the use of the mobile phone, and the like. In addition, the memory 809 may include a high-speed random access memory or a nonvolatile memory, for example, at least one disk storage device, a flash memory, or another volatile solid-state storage device.

The processor 810 is a control center of the terminal device, connects various parts of the entire terminal device by using various interfaces and circuits, and performs various functions of the terminal device and processes data by running or executing the software programs and/or the modules stored in the memory 809 and invoking data stored in the memory 809, so as to monitor the terminal device as a whole. The processor 810 may include one or more processing units. Optionally, the processor 810 may integrate an application processor and a modem processor. The application processor mainly deals with an operating system, a user interface, an application program, and the like. The modem processor mainly deals with wireless communication. It can be understood that alternatively, the modem processor may not be integrated into the processor 810.

The terminal device 800 may further include the power supply 811 (such as a battery) that supplies power to each component. Optionally, the power supply 811 may be logically connected to the processor 810 by using a power management system, to implement functions such as charging, discharging, and power consumption management by using the power management system.

In addition, the terminal device 800 includes some functional modules that are not shown. Details are not described herein.

Optionally, an embodiment of the present disclosure further provides a terminal device, including a processor 810, a memory 809, and a computer program stored in the memory 809 and executable on the processor 810. When the computer program is executed by the processor 810, each process of the embodiment of the foregoing operation method is implemented, and a same technical effect can be achieved. To avoid repetition, details are not described herein again.

An embodiment of the present disclosure further provides a non-transitory computer-readable storage medium. The non-transitory computer-readable storage medium stores a computer program. When the computer program is executed by a processor, each process of the embodiment of the foregoing operation method is implemented, and a same technical effect can be achieved. To avoid repetition, details are not described herein again. The non-transitory computer-readable storage medium may be a read-only memory (ROM), a random access memory (RAM), a magnetic disk, a compact disc, or the like.

It should be noted that, in this specification, the terms "comprise", "include", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. Without being subject to further limitations, an element defined by a phrase "including a . . . " does not exclude presence of other identical elements in the process, method, article, or apparatus that includes the very element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the related art may be implemented in a form of a software product. The computer software product is stored in a storage medium (such as a ROM/RAM, a hard disk, or a compact disc), and includes several instructions for instructing a terminal (which may be a mobile phone, a computer, a server, an air conditioner, a network device, or the like) to perform the method described in the embodiments of the present disclosure.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. An operation method, applied to a terminal device, wherein the terminal device comprises a first screen that is bendable and a second screen that is disposed on a side frame of the terminal device, and the method comprises:
   displaying shortcut function icons on the second screen, in a case that the first screen is bent and displays an information input box;
   receiving a first input operation performed on a target function icon in the shortcut function icons; and
   in response to the first input operation, executing a function corresponding to the target function icon; wherein the executing the function corresponding to the target function icon comprises:
  in a case that the target function icon is an emoji library icon, displaying emoji information associated with the emoji library icon on the second screen;
  in a case that the target function icon is an album icon, displaying images associated with the album icon on the second display area;
  in a case that the target function icon is a contact list icon, displaying contact icons associated with the contact list icon on the second screen; and
  in a case that the target function icon is an input method mode switching icon, switching an input method mode.

2. The method according to claim 1, wherein before the receiving a first input operation performed on a target function icon in the shortcut function icons, the method further comprises:
  obtaining bending parameters of the first screen, wherein the bending parameters comprise a bending angle and a bending position; and
  displaying the information input box in a first display area of the first screen and displaying an information editing window in a second display area of the first screen, according to the bending parameters.

3. The method according to claim 1, wherein after the displaying images associated with the album icon on the second display area, the method further comprises:
  receiving a drag operation performed on a target image displayed in the second display area; and
  in response to the drag operation, moving the target image from the second display area to the information input box.

4. The method according to claim 1, wherein after the displaying contact icons associated with the contact list icon on the second screen, the method further comprises:
  receiving an association operation performed on at least two contact icons displayed on the second screen; and
  in response to the association operation, creating a chat group comprising contacts corresponding to the at least two contact icons, and displaying the chat group in the first display area.

5. A terminal device, comprising a first screen that is bendable and a second screen that is disposed on a side frame of the terminal device, wherein the terminal device further comprises a processor, a memory, and a computer program stored in the memory and executable on the processor; and the computer program, when executed by the processor, causes the terminal device to perform:
  displaying shortcut function icons on the second screen, in a case that the first screen is bent and displays an information input box;
  receiving a first input operation performed on a target function icon in the shortcut function icons; and
  in response to the first input operation, executing a function corresponding to the target function icon; wherein
  the computer program, when executed by the processor, causes the terminal device to perform:
  in a case that the target function icon is an emoji library icon, displaying emoji information associated with the emoji library icon on the second screen;
  in a case that the target function icon is an album icon, displaying images associated with the album icon on the second display area;
  in a case that the target function icon is a contact list icon, displaying contact icons associated with the contact list icon on the second screen; and
  in a case that the target function icon is an input method mode switching icon, switching an input method mode.

6. The terminal device according to claim 5, wherein the computer program, when executed by the processor, causes the terminal device to further perform:
  obtaining bending parameters of the first screen, wherein the bending parameters comprise a bending angle and a bending position; and
  displaying the information input box in a first display area of the first screen and displaying an information editing window in a second display area of the first screen, according to the bending parameters.

7. The terminal device according to claim 5, wherein the computer program, when executed by the processor, causes the terminal device to further perform:
  receiving a drag operation performed on a target image displayed in the second display area; and
  in response to the drag operation, moving the target image from the second display area to the information input box.

8. The terminal device according to claim 5, wherein the computer program, when executed by the processor, causes the terminal device to further perform:
  receiving an association operation performed on at least two contact icons displayed on the second screen; and
  in response to the association operation, creating a chat group comprising contacts corresponding to the at least two contact icons, and displaying the chat group in the first display area.

9. A non-transitory computer-readable storage medium, wherein the non-transitory computer-readable storage medium stores a computer program, and the computer program, when executed by a processor of a terminal device, causes the terminal device to perform:
  displaying shortcut function icons on the second screen, in a case that the first screen is bent and displays an information input box;
  receiving a first input operation performed on a target function icon in the shortcut function icons; and
  in response to the first input operation, executing a function corresponding to the target function icon;
  wherein the terminal device comprises a first screen that is bendable and a second screen that is disposed on a side frame of the terminal device; wherein
  the computer program, when executed by the processor, causes the terminal device to perform:
  in a case that the target function icon is an emoji library icon, displaying emoji information associated with the emoji library icon on the second screen;
  in a case that the target function icon is an album icon, displaying images associated with the album icon on the second display area;
  in a case that the target function icon is a contact list icon, displaying contact icons associated with the contact list icon on the second screen; and
  in a case that the target function icon is an input method mode switching icon, switching an input method mode.

10. The non-transitory computer-readable storage medium according to claim 9, wherein the computer program, when executed by the processor, causes the terminal device to further perform:
  obtaining bending parameters of the first screen, wherein the bending parameters comprise a bending angle and a bending position; and
  displaying the information input box in a first display area of the first screen and displaying an information editing window in a second display area of the first screen, according to the bending parameters.

11. The non-transitory computer-readable storage medium according to claim 9, wherein the computer program, when executed by the processor, causes the terminal device to further perform:
- receiving a drag operation performed on a target image displayed in the second display area; and
- in response to the drag operation, moving the target image from the second display area to the information input box.

12. The non-transitory computer-readable storage medium according to claim 9, wherein the computer program, when executed by the processor, causes the terminal device to further perform:
- receiving an association operation performed on at least two contact icons displayed on the second screen; and
- in response to the association operation, creating a chat group comprising contacts corresponding to the at least two contact icons, and displaying the chat group in the first display area.

\* \* \* \* \*